Nov. 20, 1951    H. R. GRAYBILL    2,575,515
GUN TRAP FOR PREDATORY ANIMALS
Filed Nov. 27, 1945
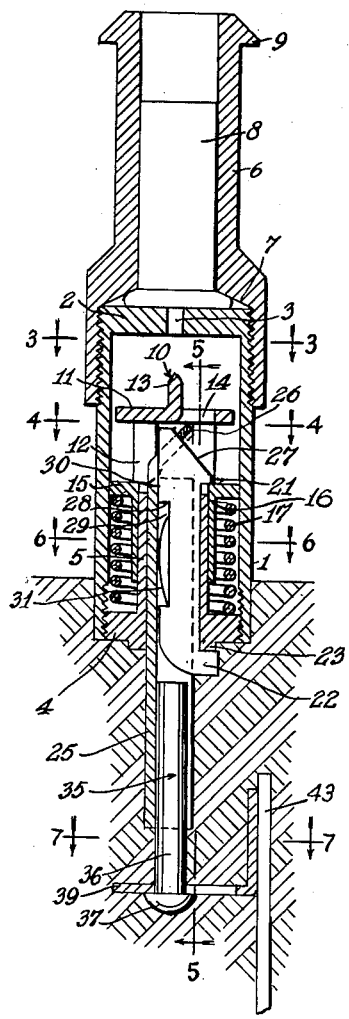
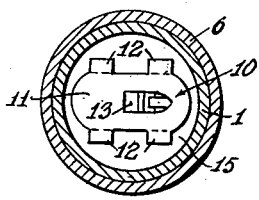
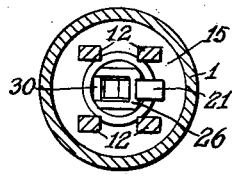
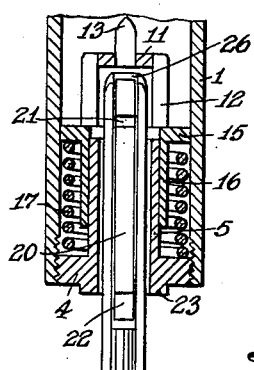
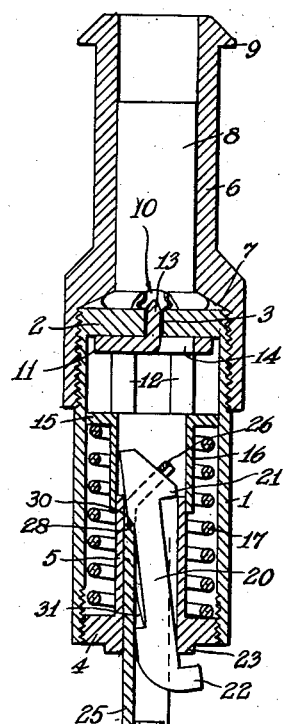
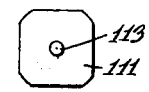
INVENTOR.
HERSHEY ROY GRAYBILL
BY
Robert E. Burns
ATTORNEY.

Patented Nov. 20, 1951

2,575,515

UNITED STATES PATENT OFFICE 2,575,515

GUN TRAP FOR PREDATORY ANIMALS

Hershey Roy Graybill, Manheim, Pa., assignor to Animal Trap Company of America, Lititz, Pa., a corporation of Pennsylvania Application November 27, 1945, Serial No. 631,017

6 Claims. (Cl. 43—84)

The present invention relates to traps for destroying certain predatory animals, for example coyotes and wolves, by explosively discharging poison or other materials into the mouth of an animal springing the trap. The trap is loaded with the poison or other lethal material and a propellent charge which are preferably contained in a cartridge somewhat similar to a gun cartridge, and is provided with mechanism for detonating the propellant when bait secured to a suitable bait holder is seized by the animal for which the trap is set.

The trap is intended to be used out of doors and to be substantially buried in the ground so that the bait is the only portion visible when the trap is set. As the trap is thus subjected to the deleterious effects of dirt, rain, snow and ice it must be capable of operating under highly adverse conditions. Moreover, the trap must be sufficiently sensitive to be discharged quickly and surely when the bait is seized by an animal for which the trap is set and must yet be entirely safe so that the trap will not be discharged accidently while being set or by being stepped on or struck by cattle, sheep, horses or other animals. To be satisfactory from a practical and commercial point of view, the trap must be sufficiently simple and foolproof that it can be used and serviced by persons not having any great amount of mechanical skill and must be sufficiently inexpensive that a trapper can afford to own and operate a large number of the traps.

While traps of the general character of those to which the invention relates have been heretofore proposed, serious difficulties have been encountered in securing dependability of operation under all conditions of use. In some instances the traps have had exposed operating mechanism which has been found to become fouled and rendered inoperative by dirt, sand, ice or other obstructions. With other previously proposed constructions, dirt and water have been able to enter the interior of the trap and interfere with its operation. Moreover, many of the prior art traps have been open to the objection of being so complicated as to be expensive to manufacture and difficult to keep in operating condition.

It is an object of the present invention to provide a greatly improved trap overcoming the difficulties and objections heretofore experienced in traps of the general type to which the invention pertains.

A feature of the novel trap in accordance with the present invention is that the operating mechanism is completely enclosed so as to exclude rain, sand or other extraneous material that would interfere with operation of the trap. The body portion of the trap is closed at its top and sides and acts like a diving bell to prevent the entry of water around a trigger portion which extends through the bottom closure of the trap. Morever, in a preferred embodiment of my invention the trigger extends down through a tube or well that is hermetically sealed to or integral with the bottom of the body portion and further prevents the entry of dirt or water into the interior of the trap in much the same way that the well of a centerboard boat prevents entry of water into the boat. The tube also serves as a guide for the trigger as well as for the firing pin of the trap and a sear for holding the firing pin in set or "cocked" position.

A feature of the present invention is that the trap operates on a "center pull" principle with the operating force for springing the trap coinciding with the vertical center line of the mechanism. The forces for operating the firing pin of the trap and for holding the firing pin in cocked position are also centered and directly oppose one another. The "center pull" principle of operation eliminates torsional forces that might cause binding of the parts and assures dependable operation.

The effectiveness of the trap in accordance with the present invention is further increased by the fact that full swivel action allows the trap to have free movement in the direction of an animal's pull on the bait so as to automatically aim itself at the animal. The trap is also free to revolve relative to its anchorage, making it impossible for an animal to unscrew the cartridge holder and thereby disarm the trap.

In the embodiment of the invention illustrated in the drawings, the trap is anchored by means of an independent stake that requires no special tools for driving and can be set in place before the loaded trap is put in position. The connection between the trap and the anchor stake permits free insertion or removal of the trap by the trapper but when the assembled device is buried in the ground as it normally is in use the trap can not be accidently disengaged from its anchorage. The ease with which the trap can be connected with the anchor stake when setting the trap contributes to the safety with which the trap can be set and handled by the operator.

The safety of handling the trap is further increased by the swivel connection that permits the trap to be tipped away from the operator during the process of making a "set." A further safety feature of the trap in accordance with the present invention is that because of the large surface of contact between the sear and the firing pin and a novel locking action of the trigger against the sear when the mechanism is in "set" position the possibility of the trap being sprung accidentally is substantially reduced.

Of primary importance from the point of view of both the manufacturer and the user of the trap is the simple and rugged construction that not only assists in keeping down the cost of traps in accordance with the present invention, but also assures continued dependable operation. A feature of the present construction is that it permits considerable tolerances in manufacture without affecting the sensitivity and dependability of the trap and makes possible the use of relatively inexpensive stampings in place of the more expensive machined parts heretofore required.

Still other objects and advantages of my invention will be apparent from the following description and appended claims in conjunction with the accompanying drawings which show by way of example an embodiment selected to illustrate the invention.

In the drawings.

Fig. 1 is an approximately central longitudinal section of a trap embodying my invention, certain parts being shown in side elevation. In this figure the mechanism of the trap is shown in "set" position.

Fig. 2 is a longitudinal section similar to Fig. 1 but showing the trap in "sprung" position.

Figs. 3 and 4 are transverse sections of the trap taken approximately on the lines 3—3 and 4—4 respectively in Fig. 1.

Fig. 5 is a partial longitudinal section at right angles to that of Fig. 1 being taken approximately on the line 5—5 in Fig. 1.

Figs. 6 and 7 are transverse sections taken approximately on the lines 6—6 and 7—7 respectively in Fig. 1.

Fig. 8 is a top view of a modified form of firing pin that may be used in the trap of the present invention.

Fig. 9 is a vertical section of the firing pin shown in Fig. 8.

Fig. 10 is a vertical section of the end portion of the trigger, showing an integral anchoring means.

One embodiment of my invention is shown by way of example in Figs. 1 to 7 of the drawings. The trap shown in the drawings has a hollow cylindrical casing or body portion 1 which is closed at both ends. The upper end closure 2 of the body portion or housing 1 is provided with a small central opening 3 for the firing pin as hereinafter described. The lower end closure 4 of the body portion is also provided with a central opening which is surrounded by an upwardly projecting tube or well 5. The tube 5 preferably projects a substantial distance up into the body portion 1 and is integral with or hermetically sealed to the lower end closure 4. One or the other of the end closures is made removable to permit assembly of the operating mechanism of the trap. In the embodiment shown in the drawings, the closure 4 screws into the internally threaded uower end of the body portion 1.

At its upper end, the body portion 1 is provided with means for holding an explosive cartridge and for holding bait. The cartridge holder is so constructed that a cartridge can readily be inserted and the case of a discharged cartridge readily removed from the holder. In the embodiment illustrated in the drawings a hollow cylindrical cartridge holder or chamber 6 is removably attached to the body portion 1 as by being screwed on to the externally threaded upper end of the body portion. An internal shoulder 7 of the cartridge holder is adapted to engage the rim of a cartridge 8 to hold the latter tightly in the chamber against the upper end closure 2 of the body portion. The cartridge case of a discharged cartridge is removed from the chamber by unscrewing the holder 6 from the body portion 1. A new cartridge can thereupon be inserted in the cartridge holder and the latter screwed back on to the body portion of the trap. When a cartridge is in place, the small central opening 3 in the end closure 2 is closed by the cartridge so that the upper end of the body portion 1 is substantially hermetically sealed. The cartridge chamber 6 also serves as a bait holder and for this purpose is provided at its upper end with an external rim or flange 9 to assist in retaining the bait in position about the cartridge chamber. It will be understood that the term bait is herein used generically to include any bait, lure or the like for attracting the animal for which the trap is set.

Inside the body portion 1 there is provided operating mechanism for firing or discharging an explosive cartridge held in the cartridge chamber 6 when the bait is seized by the animal. The operating mechanism comprises a firing pin, a spring or other elastic medium for actuating the firing pin, a sear for releasably holding the firing pin in set position against the action of the spring and a trigger for releasing the firing pin from the sear. As illustrated in Figs. 1 to 5 of the drawings, the firing pin 10 has a disc like head portion 11, downwardly projecting portions 12 and an upwardly projecting point 13 aligned with and adapted to enter the opening 3 in the upper end closure 2 of the body portion of the trap. An opening 14 extends through the head portion 11 of the firing pin. It will be seen that the firing pin can readily be made as a stamping from sheet metal.

The downwardly projecting portions 12 of the firing pin rest on the flange 15 of a flanged sleeve 16 which is reciprocable axially of the tube 5 that projects upwardly from the lower end closure 4 of the body portion 1. The flanged sleeve 16 is guided in its reciprocable movement by the tube 5 but should be of a sufficiently loose fit as to slide easily without any possibility of binding. The flange 15 of the sleeve 16 may also slidably engage the inner wall surface of the body portion 1 if desired. A helical compression spring 17 which surrounds the sleeve 16 and tube 5 acts between the flange 15 of the sleeve and the bottom closure 4 of the body portion to urge the sleeve 16 and firing pin 10 in an upward direction. While the firing pin 10 and the flanged sleeve 16 are shown in the drawings as two separate parts, they normally move together and may for convenience be referred to genericaly as the firing pin of the trap. The members 10 and 16 may if desired be united or made integral with one another.

The firing pin is releasably held in set position (Fig. 1) against the action of its spring by a sear 20. The sear is pivotally mounted in the tube or well 5 and has a notch, abutment or nose portion 21 adapted to engage the upper end of the flanged sleeve 16. As illustrated in the drawings, pivotal or angular movement of the sear is provided by the engagement of a pivot portion 22 with a flange or collar 23 on the lower closure 4 of the body portion of the trap. It will be seen that the pivot portion 22 holds the sear 20 against upward movement while permitting lateral movement of the upper end of the sear by the rocking of the sear about its pivot. The pivot portion 22 and the nose portion of the sear that engages the flange sleeve 16 are substantially in longitudinal or axial alignment when the trap is in set position. Thus a line extending through the nose portion 21 and the pivotal portion of the sear is substantially parallel with the direction of the force exerted on the flanged sleeve 16 by the spring 17. Moreover, the sear 20 is approximately centered relative to the spring 17 and the body portion of the trap. With this arrangement of parts the sear is in stable or neutral position when the trap is set (Fig. 1) and hence tends to remain in this position. The stable position of the sear and the large area of engagement between the sear and the flanged sleeve 16 greatly increase the safety of the trap since accidental release of the firing pin is avoided.

Actuation of the sear to release the firing pin when the trap is sprung by an animal for which it is set is effected by means of a trigger 25. The trigger is disposed in the tube or well 5 and is adapted to engage the sear to swing the latter about its pivot from the position shown in Fig. 1 in which the sear engages the flanged sleeve 16 to the position shown in Fig. 2 in which the flanged sleeve is released from the sear. The lower portion of the trigger 25 projects out through the bottom of the body portion 1 and is provided with anchoring means as described more fully below.

As illustrated in the drawings the trigger 25 is of channel or hollow cross section (Fig. 6) and embraces the sear 20. The trigger is slidable longitudinally in the tube 5 and is guided by the tube for reciprocatory movement in an axial direction. At its upper end the trigger 25 is provided with a stirrup or tripping portion 26 adapted to engage an inclined surface 27 of the sear 20. Upon upward movement of the body portion of the trap relative to the trigger 25 the tripping portion 26 engages the inclined surface 27 of the sear to swing the sear about its pivot in a counterclockwise direction as viewed in Fig. 1 so as to disengage the sear from the flanged sleeve 16. The flanged sleeve and the firing pin 10 are thereupon driven upwardly by the force of the spring 17 causing the point 13 of the firing pin to pass through the opening 3 and strike a percussion cap or other detonating device of the cartridge so that the cartridge is discharged.

The rear side of the sear 20, i. e. the side opposite the nose portion 21, is provided with a shoulder 28 and recess 29. When the sear is in the released position (Fig. 2) an upper edge portion 30 of the trigger 25 lies in the recess 29. Upon upward movement of the trigger relative to the body portion and the sear such as occurs in setting the trap as described more fully below, the edge portion 30 of the trigger engages the shoulder 28 of the sear and positively swings the sear in a clockwise direction about its pivot so as to bring the nose of the sear into full engagement with the flanged sleeve 16 of the firing pin. When the trap is in set position (Fig. 1) the upper edge portion of the trigger lies behind the sear so as to lock the sear positively in engagement with the flanged sleeve 16. This feature of my invention further increases the safety of the trap.

A small spring, such as the bow spring 31, may if desired be provided in the recess 29 between the sear 20 and the trigger 25 to urge the sear toward set position. It will be seen that the sear 20 and trigger 25 are both of such construction that they can readily be manufactured as sheet metal stampings and can hence be cheaply manufactured.

When the trap is set, it is anchored in position by anchoring the downwardly projecting end of the trigger 25. For this purpose the lower end of the trigger is provided with anchoring means which is shown in the form of a rivet like member 35 having a shank portion 36 and an enlarged end portion or head 37. The upper portion of the shank 36 extends into the hollow trigger member 25 and is suitably secured thereto, for example by being welded or gripped between the side walls of the trigger. The downwardly projecting end of the rivet 35 is adapted to be removably connected with a suitable anchor which is shown in the form of a straight stake 38 having a laterally projecting arm or bracket 39. The bracket is provided with a keyhole slot 40 having an enlarged portion 41 and a narrow neck portion 42. The trigger 25 is anchored to the stake by inserting the head of the rivet 35 through the enlarged portion 41 of the keyhole slot in the bracket 39 and then slipping the rivet laterally into the narrow part of the slot as illustrated in Fig. 7. It will be seen that this connection provides free swivelling movement and free rotation of the trap relative to the anchor stake but holds the trigger 25 against upward movement. The trap is easily connected with and disconnected from the anchor but when the anchor and lower portion of the trigger are buried in the ground, as illustrated in Fig. 1, the rivet 35 is held in the narrow portion of the slot 40 and accidental disengagement of the trigger from the anchor is prevented.

In addition to providing means for anchoring the traps as described above, the rivet like member 35 also serves as a stop, limiting upward movement of the trigger member relative to the body portion of the trap by engaging the lower end of the sear 20. In the manufacture of the trap, the bottom closure 4, tube 5, sear 20 and trigger 25 are preferably assembled as a unit and the rivet 35 is then united with the trigger 25 to secure the parts together.

The operation of the trap will be readily understood by reference to the drawings and the foregoing description of its construction. In setting the trap, the anchor stake 38 is driven into the ground either at an angle or vertically as shown. A slight excavation is preferably made so that the bracket 39 is slightly below ground level when the stake is in position. As the stake is an independent member and is provided with a driving head 43 it can be driven into the ground without any special tools and can be set in place before the loaded gun is attached to it. The stake can thus be driven even in hard or rocky ground without danger of damaging or accidentally discharging the gun trap. The cartridge holder 6 is unscrewed from the body portion 1 and the case of any previously discharged cartridge is removed. The operating mechanism of the trap is then set by moving the firing pin downwardly against the action of its spring from the position shown in Fig. 2 to that shown in Fig. 1. This can be done by means of a suitable setting tool, as shown, for example, in U. S. Patent 2,059,127 to E. P. Marlman, adapted to engage the firing pin point 13 and to pass through the opening 3 in the upper closure 2 of the body portion. As the firing pin is pushed downwardly, upward pressure is preferably applied to the trigger 25 so that when the firing pin reaches its set position, upward movement of the trigger swings the sear into engagement with the flange sleeve 16 of the firing pin and locks it in position as described above and illustrated in Fig. 1. If the sear is provided with a spring 31, it is swung into firing pin engaging position without any upward pressure being applied to the trigger 25. In this event, engagement of the inclined surface 27 of the sear with the stirrup portion 26 of the trigger moves the trigger upwardly to the position shown in Fig. 1 so that the sear is locked in set position by the trigger.

With the firing pin thus held in set position by the sear, a cartridge is inserted in the cartridge holder 6 and the latter is screwed onto the body portion of the trap. The trap is then connected with the anchor stake 36 by inserting the rivet member 35 of the trigger into the keyhole slot 40 of the bracket 39 as described above. The swivel connection between the trigger and the anchor stake permits the operator to tip the gun trap away from him during the process of making a "set." Earth may be filled in around the top of the stake and the lower portion of the trap. The position of the trap relative to ground level may be varied depending on the type of bait used, the location in which the trap is set and other factors but the ground line will ordinarily be somewhere between the bottom and the top of the body portion 1. When the earth has been filled in around the trap, the rivet 35 is held in the narrow neck portion 42 of the slot 40 so that the trap can not become accidentally disconnected from the anchor stake but can still be rotated or tipped angularly to a considerable extent. Suitable bait or lure is attached to the outside of the cartridge holder 6 at any suitable time either before or after the cartridge holder is connected with the body portion of the trap.

When the trap has been set and positioned as described above, the bait is normally the only portion showing above the ground. Although the operating mechanism of the trap is below ground level, it is protected from water, dirt or other obstructions by being enclosed in the body portion 1. As the upper end of the body portion is substantially hermetically sealed when the cartridge 8 is in place, the hollow body acts in the same manner as a diving bell to prevent entry of water through the bottom. Moreover, the upwardly projecting tube 5 of the bottom closure 4 acts like the well of a centerboard boat to prevent entry of water into the interior of the casing containing the operating mechanism. The protection of the operating mechanism of the trap from foreign elements assures effective operation of the trap under all conditions. The elimination of closely fitting parts or close tolerances also contributes to the effective operation of the trap.

As the trap is below ground level and out of sight except for the bait, there is nothing to excite the suspicions of an animal for which the trap is set. If cattle, horses or sheep or other domestic animals happen to strike or step on the bait the trap will not be sprung. It will likewise not be sprung by an animal touching or pushing the bait with its paw. Coyotes, wolves and other predatory animals are particularly wary of unfamiliar objects and have been observed to touch bait gingerly before seizing it in their mouths. The free swivel action of the trap permits lateral movement when an animal pushes the bait with its muzzle or paw and thus does not have the feel of being fastened down. When the trap is tipped it does not spring back and thereby arouse an animal's suspicion. Should the animal turn the bait either with its mouth or paw the whole trap turns freely relative to the anchor stake so that the animal can not unscrew the cartridge holder 6 from the body portion and thereby disarm the trap.

However when the animal seizes the bait in its mouth, the bait and attached body portion of the trap come up easily and the upward movement of the body portion relative to the anchored trigger of the trap instantaneously releases the firing pin as described below and discharges the cartridge into the animal's mouth. By reason of its free swivel action, the trap tips in the direction of pull of the animal and thus aims itself automatically.

The upward pull of the animal on the bait produces relative movement of the body portion of the trap away from the anchored trigger portion. This causes the stirrup or tripping portion 26 of the trigger to engage the inclined surface 27 of the sear and thereby swing the sear in a counter clockwise direction to disengage it from the flanged sleeve 16 of the firing pin. The firing pin is thereupon forced upwardly by the spring 17 and the point 13 strikes the percussion cap or other detonating medium of the cartridge 8 to fire the cartridge and discharge the poison or other lethal material into the mouth of the animal. Although the upper end of the body portion 1 is hermetically sealed, upward movement of the firing pin is not impeded or dampened by the air in the body portion since the firing pin is of such construction as to allow free passage of air from one side to the other without any substantial attenuation.

It will be noted that the firing pin, spring, sear and trigger are arranged one inside the other and are all approximately concentric with the body or housing 1. As a result of this arrangement the forces exerted in setting and springing the trap as well as the forces acting on the firing pin when the latter is held in set position by the sear are substantially in alignment with one another and with the central longitudinal axis of the trap. The alignment of these forces avoids binding or misalignment of the operating parts of the trap that might result from undesired force couples or moments. Moreover, the "center pull" arrangement increases the effectiveness of the trap since it causes the trap to aim itself more accurately in the direction of pull of an animal seizing the bait.

The trap in accordance with my invention can be readily disassembled for inspection, cleaning or repairs by unscrewing the bottom closure 4. However, when the trap is assembled its parts can not be separated by the upward pull of an animal on the bait or the resultant springing of the trap. Upward movement of the bait carrying body portion relative to the anchored trigger portion is limited by engagement of the stirrup 26 of the trigger with the sear and the engagement of the sear with the upwardly projecting tube 5 of the bottom closure 4. Moreover, the rivet portion 35 of the trigger remains firmly anchored by the stake 38 so that the trap can not be dragged off by the animal even after it has been sprung. The loss of traps is thereby minimized.

The simple construction of the trap in accordance with my invention and the elimination of close tolerances reduces the cost of manufacture of the traps and also contributes to their ruggedness, long life and dependability. Low manufacturing cost is also facilitated by the fact that the trap is of such construction that various parts of the mechanism such as the firing pin 10, the sear 20, the trigger 25 and the anchor stake 38 including the bracket 39 can be stamped from suitable sheet or strip material while other parts such as the body portion 1, the cartridge holder 6 and the well 5 can be made from suitable tubing. Although the invention has been described and illustrated with reference to a gun trap shown as attached to a stake and partially buried in the ground, it is to be understood that the invention is likewise applicable to gun traps which may be used in other sets. For example, in the far North where deep snows prevent the gun from being buried in the ground, a set may be used in which the trap is used without the stake by tying or otherwise securing it to trees or other raised supporting means.

While a specific embodiment of my invention has been illustrated in the drawings and described above, it will be understood that the invention is not limited to this particular embodiment. For example, the firing pin may be made as illustrated in Figs. 8 and 9 where it is shown as a cup-shaped member 111 having a downwardly projecting skirt portion 112 and an upwardly projecting centrally located point 113. Alternatively the separate firing pin 10 and associated flanged sleeve 16 may be replaced by a single integral member. Likewise, instead of having a separate rivet member 35, the trigger 25 can be provided at its lower end with a suitable integral portion 114 corresponding to the head of the rivet, whereupon the enlarged portion 41 of the keyhole slot 40 is increased in size to receive the portion 114 therethrough while the neck portion 42 of the slot receives the adjacent shank portion of the trigger but is smaller than the enlarged portion 114 so as to anchor the trigger to the stake. Still other modifications of the invention will be readily apparent to those skilled in the art.

What I claim and desire to secure by Letters Patent is:

1. A gun trap comprising a hollow body member having a top portion and an apertured bottom portion, a firing pin in the body member, resilient means for actuating the firing pin, a channeled trigger reciprocable within the body member and having a portion projecting out through the aperture in the bottom of the body member, a sear laterally supported within the channel of the trigger member and swingably connected with the bottom of the body member for releasably holding the resilient means against the actuation of the firing pin, and anchoring means for the projecting portion of the trigger.

2. A gun trap comprising a hollow body member having a top portion and an apertured bottom portion, a firing pin in the body member, resilient means for actuating the firing pin, a channeled trigger reciprocable within the body member and having a portion projecting out through the aperture in the bottom of the body member, a sear formed of a longitudinally extending member having transversely extending portions, one of said portions being hooked over the edge of the aperture in the bottom of the body member, the other of said portions adapted to releasably hold the resilient means against the actuation of the firing pin, and anchoring means for the projecting portion of the trigger.

3. A gun trap comprising a hollow body member having top and bottom portions thereof, a firing pin in the body member, resilient means for actuating the firing pin, a trigger reciprocable within the body member and having a stirrup portion at the top end thereof, and a sear for releasably holding the resilient means in set position, the sear positioned coaxially of the gun trap and having a surface extending outwardly and downwardly and adapted to be slidably engaged by the stirrup portion of the trigger member to move at least a portion of the sear in a transverse direction to release the resilient means and thereby actuate the firing pin.

4. A gun trap comprising a hollow body member, a firing pin in the body member, resilient means for actuating the firing pin, a trigger reciprocable within the body member and having a channeled longitudinal section, and a sear for releasably holding the resilient means in set position, the sear being positioned in the channeled section of the trigger, the upper end of the trigger member having a portion extending over the upper end of the sear to retain it within the channeled portion of the trigger member and to retain the upper end of the trigger member within the body member.

5. In a gun trap the combination with a body member having a cartridge chamber at its upper end, of operating mechanism comprising a firing pin in the body, resilient means for actuating the firing pin, a movable sear in the body for releasably holding the firing pin in set position against the action of the resilient means, a trigger for releasing the firing pin from the sear, the trigger having a channeled portion adapted to receive the sear, a portion projecting outwardly from the bottom of the body member, and an enlarged end portion and detachable anchoring means for the gun trap having a keyhole slotted portion adapted to receive the enlarged end portion of the trigger member.

6. A gun trap comprising a hollow body member, a top and a bottom for the body member each having apertures therein, a guideway member extending upwardly about the aperture in the bottom of the body member, a firing pin adapted to reciprocate within the body member and extend through the aperture in the top thereof, resilient means positioned about the guideway member in the body member and abutting against the bottom of the body member, a flanged member reciprocable within the body member and guided by the outer surface of the guideway member, the flanged member abutting the resilient member on the top thereof, a channeled trigger member positioned within the guideway member and extending outwardly from the bottom of the body member, and a sear formed of a longitudinally extending member having transversely extending top and bottom portions and positioned partially within the channeled member, the bottom portion of the sear adapted to engage with the bottom of the body member, the top portion of the sear adapted to releasably engage the flanged member to hold the resilient member against the actuation of the firing pin.

HERSHEY ROY GRAYBILL.

REFERENCES CITED

The following references are of record in the file of this patent:

UNITED STATES PATENTS

| Number | Name | Date |
|---|---|---|
| 836,453 | Muller-Bralitz | Nov. 20, 1906 |
| 1,136,432 | Mortland | Apr. 20, 1915 |
| 1,169,822 | Hindmarsh | Feb. 1, 1916 |
| 1,343,006 | Thompson | June 8, 1920 |
| 1,677,394 | Maki | July 17, 1928 |
| 1,884,721 | Karr | Oct. 25, 1932 |
| 2,253,125 | Heineki et al. | Aug. 19, 1941 |
| 2,377,658 | Wintersteen | June 5, 1945 |

FOREIGN PATENTS

| Number | Country | Date |
|---|---|---|
| 275,265 | Germany | June 12, 1914 |